(12) United States Patent
Wright et al.

(10) Patent No.: US 9,862,020 B2
(45) Date of Patent: Jan. 9, 2018

(54) METHOD AND APPARATUS FOR AUTOMATED MULTI-DRILLING AND MULTI-RIVET MACHINE

(71) Applicant: The Boeing Company, Chicago, IL (US)

(72) Inventors: Rodney Stephen Wright, Huntington Beach, CA (US); David Hassan Amirehteshami, Rossmoor, CA (US); John W. Pringle, IV, Gardena, CA (US)

(73) Assignee: The Boeing Company, Chicago, IL (US)

( * ) Notice: Subject to any disclaimer, the term of this patent is extended or adjusted under 35 U.S.C. 154(b) by 303 days.

(21) Appl. No.: 14/856,213

(22) Filed: Sep. 16, 2015

(65) Prior Publication Data

US 2016/0001350 A1    Jan. 7, 2016

Related U.S. Application Data

(62) Division of application No. 13/755,888, filed on Jan. 31, 2013, now Pat. No. 9,162,332.

(51) Int. Cl.
*B21J 15/14* (2006.01)
*B23P 11/00* (2006.01)
(Continued)

(52) U.S. Cl.
CPC ........... *B21J 15/142* (2013.01); *B23B 39/161* (2013.01); *B23P 19/04* (2013.01); *B23P 19/069* (2013.01);
(Continued)

(58) Field of Classification Search
CPC .......... B21J 15/142; B64F 5/10; B23P 19/069; B23P 23/04; B23P 19/04; B23P 2700/01;
(Continued)

(56) References Cited

U.S. PATENT DOCUMENTS 3,693,832 A * 9/1972 Adolphi ................... B21J 15/10
                                                      221/161
6,053,308 A    4/2000 Vogrig et al.
(Continued)

FOREIGN PATENT DOCUMENTS

| DE | 102008043490 | 5/2010 |
|---|---|---|
| EP | 1184131 | 3/2002 |
| WO | 2005074636 | 8/2005 |

OTHER PUBLICATIONS

International Search Report for Application No. PCT/US2013/075072 dated May 9, 2014.

*Primary Examiner* — Jun Yoo
(74) *Attorney, Agent, or Firm* — Kunzler, PC (57) ABSTRACT

Method and apparatus for assembling, with fasteners, components of a structure having an outboard side, an inboard side, and a supporting frame. The components are placed together on the frame. An electromagnet having a core with multiple openings is positioned on the outboard side. A magnetically attractive member is placed against the inboard side opposite and aligned with the electromagnet. When activated, the electromagnet is attracted towards the magnetically attractive member and the two hold the components together. Multiple drill members pass through the openings in the core of the electromagnet and multiple openings are drilled simultaneously through the components. Subsequently, multiple rivets or huck bolts are simultaneously inserted into the drilled openings.

20 Claims, 8 Drawing Sheets (51) Int. Cl.
*B23P 23/04* (2006.01)
*B23P 19/04* (2006.01)
*B25B 11/00* (2006.01)
*B23B 39/16* (2006.01)
*B25J 11/00* (2006.01)
*B23P 19/06* (2006.01)
*B64F 5/10* (2017.01)

(52) U.S. Cl.
CPC ............ *B23P 23/04* (2013.01); *B25B 11/002* (2013.01); *B25B 11/007* (2013.01); *B25J 11/005* (2013.01); *B64F 5/10* (2017.01); *B23B 2215/04* (2013.01); *B23P 2700/01* (2013.01); *Y10T 29/49622* (2015.01); *Y10T 29/49947* (2015.01); *Y10T 29/49963* (2015.01); *Y10T 29/5377* (2015.01); *Y10T 29/53961* (2015.01)

(58) Field of Classification Search
CPC .. B25J 11/005; B23B 39/161; B23B 2215/04; B25B 11/007; B25B 11/002; Y10T 29/53961; Y10T 29/5377; Y10T 29/49622; Y10T 29/49963; Y10T 29/49947; Y10T 2215/04
See application file for complete search history.

(56) References Cited

U.S. PATENT DOCUMENTS

| | | |
|---|---|---|
| 2004/0212471 A1 | 10/2004 | Day |
| 2007/0292221 A1 | 3/2007 | Nulman et al. |
| 2007/0157453 A1 | 7/2007 | Tomchick et al. |
| 2008/0181733 A1 | 7/2008 | Wright et al. |
| 2012/0011693 A1 | 1/2012 | Amirehteshami et al. |

\* cited by examiner

METHOD AND APPARATUS FOR AUTOMATED MULTI-DRILLING AND MULTI-RIVET MACHINE

BACKGROUND

In any industry, including the aerospace industry, the costs of manufacture are extremely important. The airplane manufacturer, like any other manufacturer of equipment, is well aware that reducing the costs of the airplane construction and assembly is important to its customers, such as airlines. Lowering costs to the airline may lower costs of travel to the passenger provided, of course, the assembly of the airplane is carried out in a very safe and efficient manner. The present disclosure is directed to accomplishing such goals.

One existing manufacturing technique for assembling parts of an airplane involves the assembly of overlapping sections of the fuselage. An electromagnet is positioned on the exterior of the fuselage while a steel block is positioned on the interior of the fuselage directly opposite the electromagnet. The steel block is precisely positioned with the electromagnet by a communication system between the magnet and the block, such as a permanent magnet and a finder. The electromagnet, when energized, is attracted to the steel block and moves toward the steel block for clamping two or more components between the electromagnet and the block. A drill bit is inserted through the center of the magnet and into a guide bushing. The mechanic drills and countersinks a opening through the two overlapping components or through a sheet metal stack-up. Then a rivet is manually placed into the aligned openings and is driven into the openings using a manual pneumatic insertion system.

A rivet gun and/or a pneumatic hammer is inserted down through the magnet to seat the fastener. The interference fit between the fastener and sheet metal stack holds the parts together, while the electromagnet and clamping block are moved to the next position, as applicable. Later, collars are swaged onto the installed fasteners to complete the installation if huck bolts are utilized as opposed to rivets. A chip removal system has been incorporated into the drilling system to eliminate debris generated from the drilling process. All of the described operations are performed primarily manually. Each opening drilled, each placement of the rivet or other fastener in the opening, and each completion of the securement of the rivet or other fastener in place are individually and manually performed. Although the manufacturing technique described above results in safely assembled components, the manufacturing is basically a manual process requiring at least two or more individuals working from both outside the airplane fuselage and inside the airplane fuselage to accomplish a fastening operation such as riveting.

It would be highly desirable to accomplish the safe and secure manufacture of a sub-assembly of an airplane, such as attaching sections of a fuselage to each other, to the frame, or to other components of the airplane in a more efficient manner. Any increase in the speed of manufacturing sub-assemblies would be highly beneficial.

Further limitations and disadvantages of conventional manufacturing approaches will become apparent to one skilled in the art through comparison of such approaches with the present disclosure as set forth in the remainder of the present application including the drawings.

BRIEF SUMMARY

One aspect of the present disclosure involves the construction or assembly of sections of the fuselage of an airplane being positioned on a preexisting frame. The disclosure particularly involves improvements in the method and apparatus for assembling these components together and for attachment to the preexisting frame of the airplane. The method for assembling the components includes the steps of providing first and second components wherein each component is provided with a fastener zone for later receiving fasteners, including rivets or bolts, for attaching overlapping components together along their respective fastener zones for thereby providing an overlapping fastener receiving zone while the two components are being supported on the preexisting frame.

An electromagnet is placed against the exterior or outboard side of the components and a magnetically attractive backing plate member is placed against the interior or inboard side of the two components. It is important for the electromagnet to be aligned with the magnetically attractive backing plate member while both the electromagnet and magnetically attractive backing plate member are aligned with the overlapping fastener receiving zone. The electromagnet is activated for thereby being attracted to the aligned and magnetically attractive backing plate member in the interior or inboard side of the airplane fuselage for thereby substantially clamping the two components together at the overlapping fastener receiving zone.

A magnetizable core is provided on the electromagnet and the core is provided with multiple openings completely therethrough. The openings are positioned at a substantially normal or 90 degree orientation relative to the overlapping fastener receiving zone of the two components. Multiple drill bit members are operatively provided on a power drilling member for passage of said drill bits into the same number of openings in the core for drilling the same number of openings substantially simultaneously in the overlapping fastener receiving zone of the two components. Preferably, guide bushings are positioned on opposite sides of the overlapping fastener receiving zone.

After the multiple openings have been provided in the overlapping fastener receiving zone of the two components, a fastener placement member simultaneously picks the same number of fasteners and inserts the multiple fasteners simultaneously into the openings that have been simultaneously drilled in the overlapping fastener receiving zone of the two fasteners. After the simultaneous insertion of the fasteners in the drilled openings, an operating powerized drive member simultaneously drives, such as by hammering, the fasteners through the openings in said overlapping fastener receiving zone in a normal direction. A backing plate is provided on the inboard side and the fasteners, such as rivets, have their ends driven against the bucking bar carried by the backing plate for attaching the two components together along the overlapping fastener receiving zone.

To summarize, a simultaneous process of drilling multiple openings is provided. The multiple opening drilling is followed by the simultaneous multiple insertion of two or more fasteners in the openings and the fasteners are secured in place to attach the components together. In the case of rivets, multiple rivets in the openings are hammered against a bucking bar, carried by the backing plate, on the inboard side of the components. In some cases, bolts, such as huck bolts are used rather than rivets. Huck bolts are inserted into the drilled openings, but they are secured manually by inserting the operating end of a huck gun into openings provided in backing plate.

The apparatus provided for carrying out the method or system as described above generally has three main operating components, as follows:

(1) An electromagnet is provided on the outboard side of the airplane. The electromagnet has multiple laterally and upright aligned openings drilled through its magnetizable center core. Preferably, drill bushings are provided at each end of the openings to be drilled for the purpose of drilling and countersinking multiple openings in the overlapping fastener receiving zone concurrently or simultaneously from the outboard side of the airplane.

(2) An end effector of a robotic assembly is provided on the outboard side of the airplane. The end effector is designed to simultaneously drill, install and hammer multiple rivets or bolts into the multiple openings provided in the electromagnet. Another end effector is provided on another robotic member for controlling the position of the electromagnet member during the drilling, inserting and hammering operations.

(3) A backing plate member is provided on the inboard side of the airplane. The backing plate member is made of a magnetizable material and is used throughout the assembly process. Four similar but different types of backing plates are provided. Each type is used to accomplish and complete the fastening of the rivets or bolts being used to secure the two components of the airplane together along the overlapping fastener receiving zone. As discussed above, the magnetizable backing plate attracts the exterior electromagnet when the electromagnet is activated, thereby clamping the two sections of the airplane components together along the overlapping fastener receiving zone.

Four different types of backing plates are:

(a) [Attached to the airplane frame and used for rivets] Backing plate (a) is made of a magnetizable steel material which attracts the activated electromagnet on the outboard side of the overlapping fastener receiving zone. The backing plate (a) includes multiple generally horizontal longitudinal bucking bars carried on the interior side of the backing plate and are facing the interior of the overlapping fastener receiving zone. Multiple actuators are carried by the backing plate (a) and are operatively connected to the bucking bars to drive them towards the rivet ends during the riveting operation to deform the rivet ends and fasten the rivets along the overlapping fastener receiving zone of the two components. The fastening of multiple rivets is accomplished substantially simultaneously.

(b) [Attached to the frame with suction cups and is used for rivets] The backing plate (b) is similar to the backing plate type (a) including the use of multiple bucking bars and actuators. Six suction cup assemblies are provided and bear against the inner surface of the interior side of the two components. The suction cups are used when there is no airplane frame part such as stringers/longerons to which the backing plate can be securely attached.

(c) [Attached to the frame and is used for huck bolts] In the case of huck bolts being used, the backing plate has multiple openings provided that face to the interior of the airplane and align with the ends of huck bolts that have been inserted into the drilled openings. The securement of the huck bolts requires the use of a manually operated huck gun to finish the assembly. The backing plate type (c) is similar to the (a) type of backing plate since it may be assembled to the frame such as on stringers/longerons; and (d) [Attached to frame with suction cups and is used for huck bolts] The type (d) of backing plate is similar to both types (b) and (c). The (d) type backing plate is the same as the (b) type since there is no frame part for attachment so suction cups must be used to hold the backing in plate on the interior side of the components being secured together by huck bolts. The type (d) backing plate is also similar to the type (c) since a huck gun is used for securing huck bolts through openings aligned with the huck bolts filling the drilled openings.

An alternative design for a backing plate is also provided wherein the backing plate is smaller in size than the backing plates (a)—(d), as discussed above. The alternative design will be further described below.

The features, functions, and advantages that have been discussed can be achieved independently in various embodiments or may be combined in yet other embodiments, further details of which can be seen with reference to the following description and drawings.

DETAILED DESCRIPTION

Figure 1:
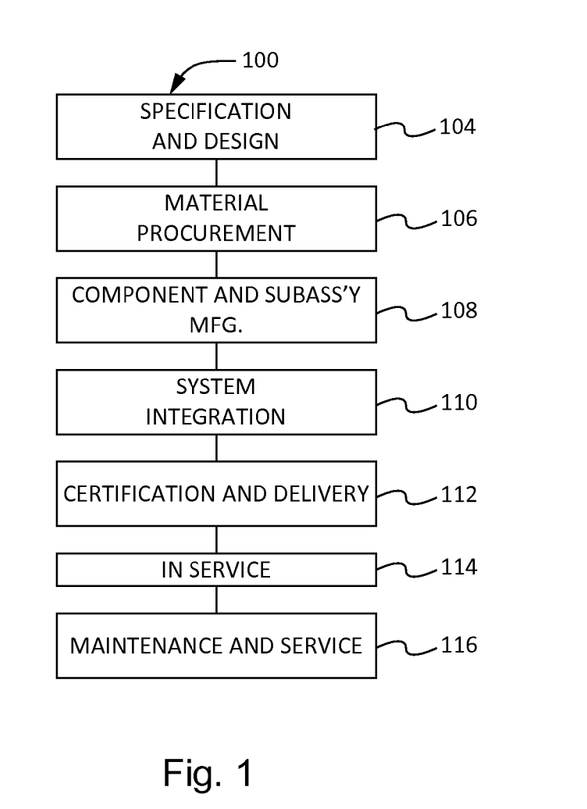
FIG. 1 is a flow diagram of airplane production and service methodology.
Figure 2:
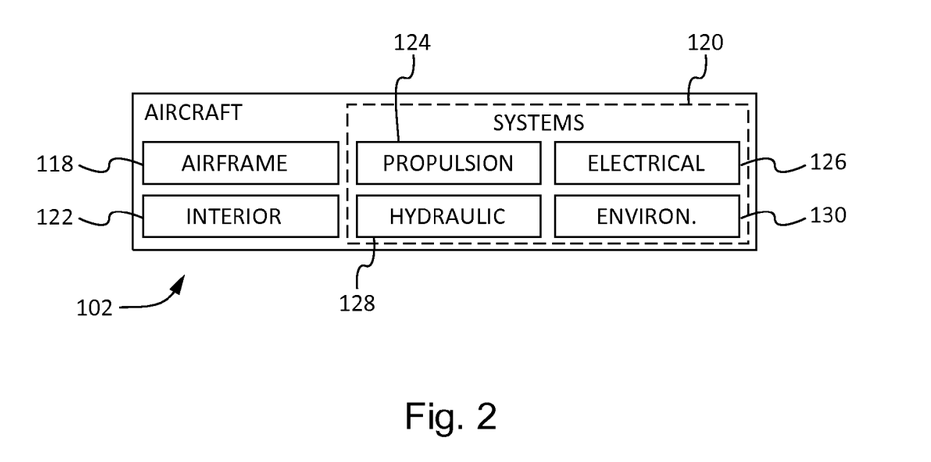
FIG. 2 is a block diagram of an airplane.

Referring more particularly to the drawings, embodiments of the disclosure may be described in the context of an airplane manufacturing and service method 100 as shown in FIG. 1 and an airplane 102 as shown in FIG. 2. During pre-production, exemplary method 100 may include specification and design 104 of the airplane 102 and material procurement 106. During production, component and subassembly manufacturing 108 and system integration 110 of the airplane 102 takes place. Thereafter, the airplane 102 may go through certification and delivery 112 in order to be placed in service 114. While in service by a customer, the airplane 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of airplane manufacturers and major-system subcontractors; a third party may include without limitation any number of venders, subcontractors, and suppliers; and an operator may be an airline, leasing company, military entity, service organization, and so on.

As shown in FIG. 2, the airplane 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the airplane 102 is in service. Also, one or more apparatus embodiments, method embodiments, or a combination thereof may be utilized during the production stages 108 and 110, for example, by substantially expediting assembly of or reducing the cost of an airplane 102. Similarly, one or more of apparatus embodiments, method embodiments, or a combination thereof may be utilized while the airplane 102 is in service, for example and without limitation, to maintenance and service 116.

Referring to FIGS. 1 and 2, the description to be hereinafter provided in one aspect falls within category 108 of FIG. 1, namely "Component and Subassembly Manufacturing" and within category 118 of FIG. 2, namely "Airplane Airframe."

Figure 3:
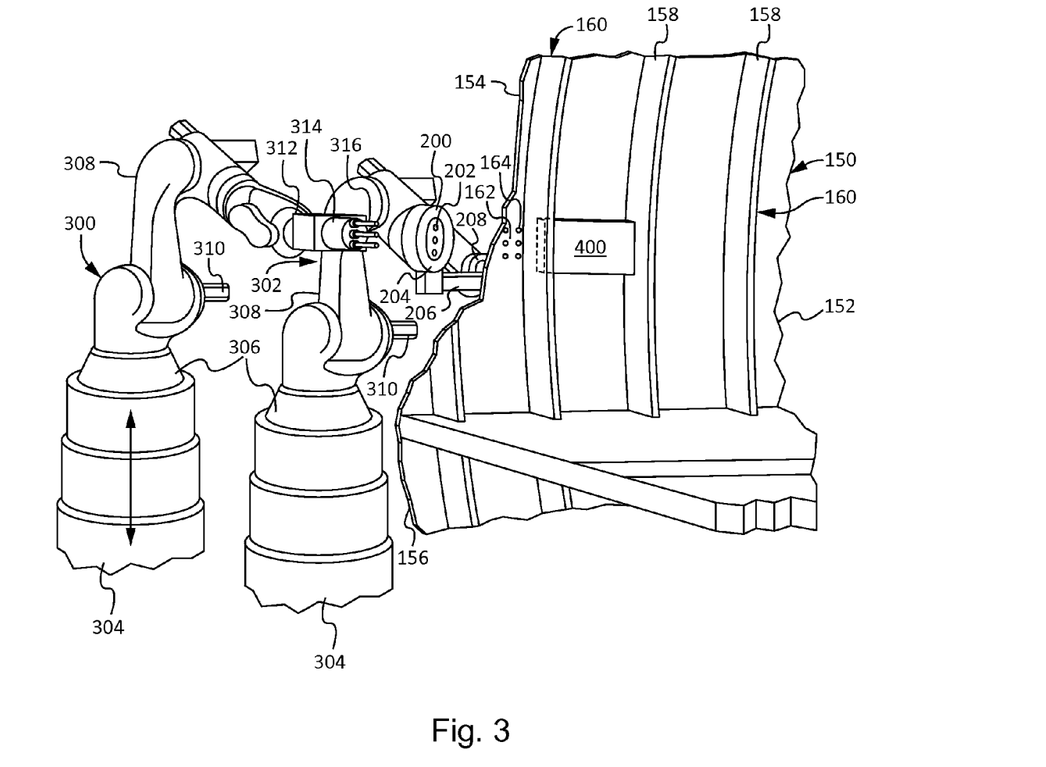
FIG. 3 is a pictorial view showing operating components for assembling components of an airplane, showing both inboard operating components and outboard operating components relative to the airplane itself.
Figure 6:
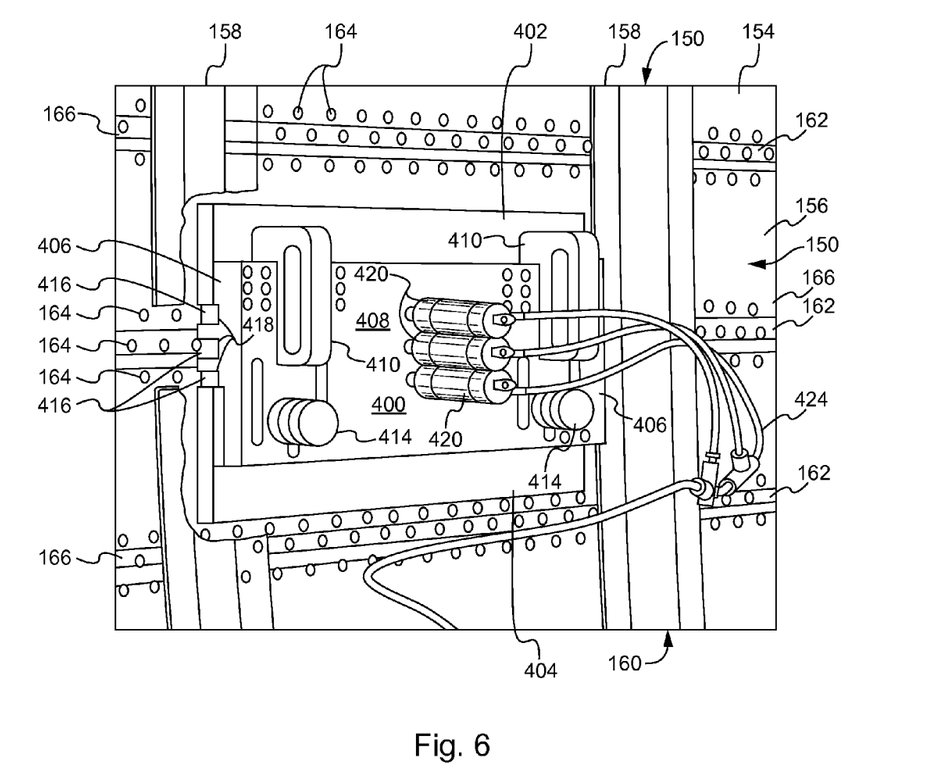
FIG. 6 is a pictorial view showing a backing plate mounted on the inboard side of an airplane fuselage sections being attached together.

Referring to FIG. 3, a structure, such as an airplane, generally 150, is shown from the inboard or interior side of, e.g., the fuselage, generally 152, having an upper section 154 and a lower section 156. The sections 154 and 156 are initially placed in a selected position on fuselage support struts 158. The struts 158 are part of the frame 160 supporting the fuselage 152, which is only partially shown by the struts 158. Referring also to FIG. 6 and to the upper and lower sections 154 and 156, each section 154 and 156 has a fastener receiving zone, each of which overlap to provide a combined overlapping fastener receiving zone 162, as represented by the laterally aligned generally horizontal vertically spaced rows of openings 164 in the overlapping fuselage sections 154 and 156. Openings are also shown in the elongated stringers 166 which are components of the frame 160. The openings 164, as will be discussed hereinafter, receive fasteners, such as rivets or bolts in the area generally defined by the fastener receiving zone 162 of the upper and lower sections 154 and 156 of the fuselage 152.

Figure 11:
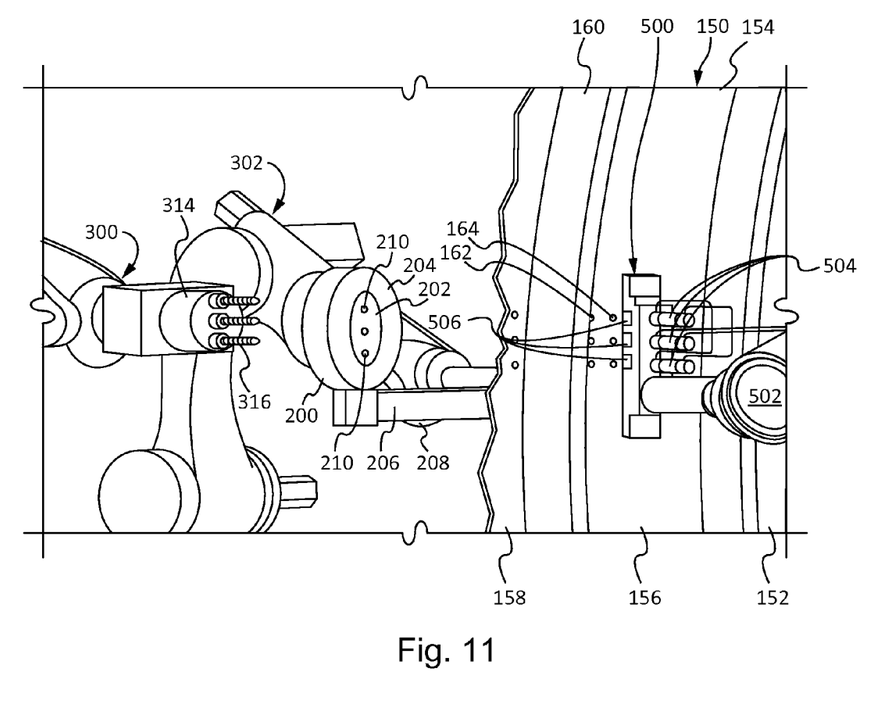
FIG. 11 is a pictorial view of a smaller backing plate and a riveting tool capable of processing multiple rows of rivets simultaneously for partial or full frame assembling.

Following is a description of each of the operating tool parts of the apparatus required for accomplishing the assembly or pre-assembly of the airplane 150 including at least two fuselage sections or components 154 and 156 by multiple operating tools;

(a) electromagnets, as seen best in FIGS. 4A-4D;
(b) end effectors, as seen best in FIG. 1 and FIGS. 5A-5D;
(c) four types of magnetizable or magnetically attractive backing plates as seen best in FIGS. 6-9; and
(d) an alternative backing plate and riveting tool as shown in FIG. 11.

Each of the operating tools will be described in detail below with reference to the drawings. These descriptions will be followed by a detailed description of the operating method of using the operating parts described to assemble certain components of an airplane. It is to be understood that the descriptions provided above and to be described below are considered to be representative only of the concepts disclosed and claimed hereinafter. Such concepts are intended to encompass a wide variety of uses in areas outside of the airplane assembly industry.

II. Operating Tools of an Airplane Assembly or Pre-Assembly

A. Electromagnet

Figure 4A:
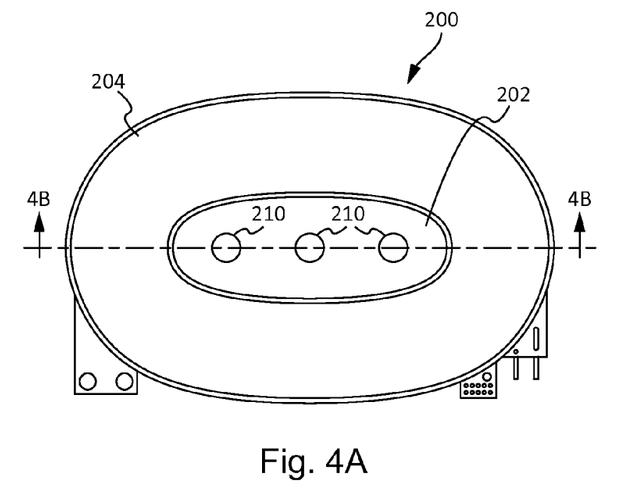
FIG. 4A is a plan view of an electromagnet utilized on the outboard side of the airplane and is used for assembling components of an airplane.
Figure 4B:
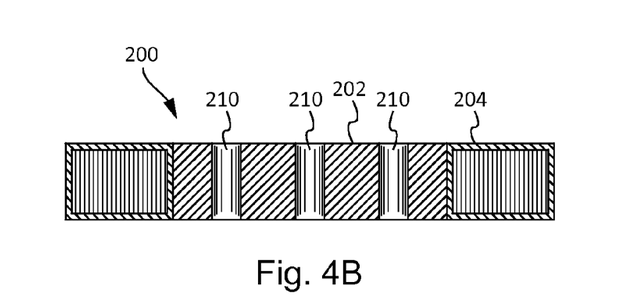
FIG. 4B is a sectional view of the electromagnet taken along the line 4B-4B of FIG. 4A.
Figure 4C:
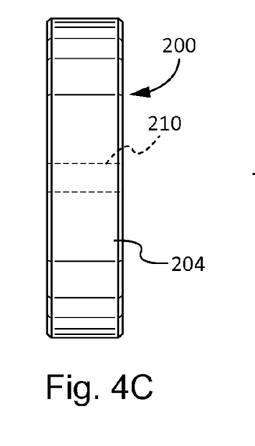
FIG. 4C is a side view of the electromagnet of FIG. 4A.
Figure 4D:
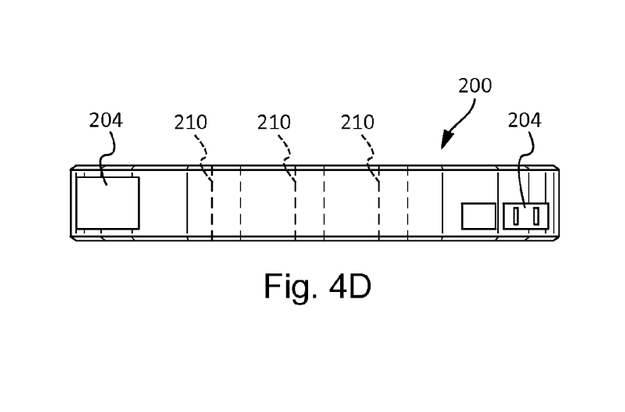
FIG. 4D is a front view of the electromagnet shown in FIG. 4A.

An electromagnet, generally 200, is best seen in FIG. 3 and FIGS. 4A-4D. Electromagnet 200 is made up of an oval shaped inner magnetizable iron containing steel core 202 which is surrounded by an electric coil or solenoid 204 which is also oval in shape as shown in FIG. 4A. The coil 204 is operatively connected to a power source (not shown) which is selectively activated by a control system (not shown) to cause electric current to flow through the coil 204 or deactivated to stop the flow of current through the coil 204. In the activated condition, the coil 204 will activate or magnetize the core 202.

As shown best in FIG. 3 and FIG. 11, the electromagnet 200 is carried on an arm 206 which extends inwardly towards the fuselage 152. The arm 206 is operatively mounted on an end effector 208 of a robotic member 210. With particular reference to FIG. 4A and sectional view FIG. 4B, three openings 210 are provided which pass in an upright or normal direction completely through the magnetic core 202. While only three openings are shown, as few as two openings may be placed in the core 202 or additional openings may be provided depending on the work requirements to be described hereinafter. The openings 210 are each provided with a preselected diameter depending on the size of the fasteners (rivets or huck bolts) to be passed therethrough. The electromagnet 200 is directly involved in a drilling operation, a fastener inserting operation, and a fastener driving or hammering operation to be described hereinafter.

B. End Effectors and Robotic Members

1. Drilling

Referring in particular to FIG. 3, two robotic members, generally 300, and, generally 302, are provided. Robotic member 300 is used for effecting the drilling operation through final riveting. The robotic member 302 is used to control the movement and positioning of the electromagnet 200 as shown in FIGS. 3 and 11.

Each robotic member 300 and 302 includes a base 304 which is moveable in a vertical up and down direction. The base 304 of each robotic member 300 and 302 has a rotatable support 306 mounted thereon which is rotatably moveable about an upright axis of the base 304. Each rotatable support 306 has a generally upright support arm 308 rotatably supported thereon about a transverse axis 310.

Figure 3A:
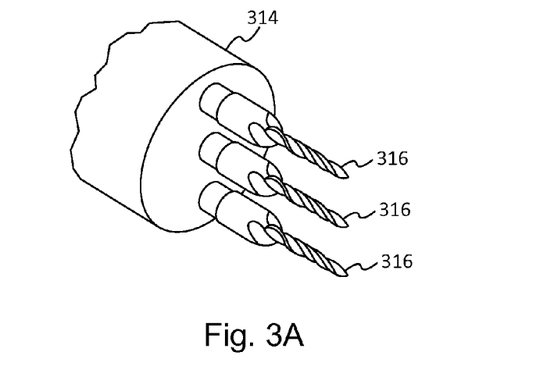
FIG. 3A is a detailed pictorial view showing a portion of the end effector of a drill bit assembly utilizing multiple countersink drill bits.

The robotic member 300 is provided with a generally laterally projecting tool support member 312. The support member 312 of the robotic member 300 includes an end effector 314 operatively mounted on its outer end. The end effector 314, shown in FIGS. 3 and 3A, operatively supports three drill bits 316, preferably countersink drill bits, which are laterally spaced apart and are operatively received by and operatively pass though the openings 210 in the electromagnet core 202. The spacing and size of the openings 210 are designed to receive the three drill bits 316 for the drilling process of the sections 154 and 156, to be hereinafter described. Normally, the number of drill bits 316 matches the number of openings 210.

Referring to FIG. 3, the robotic member 302 that is operatively connected to the electromagnet 200 also includes a base 304, a rotatable support 306, an upright arm 308, and the operating tool support member 312 as described above relative to the robotic member 300.

In addition to the same types of parts used for the two robotic members 300 and 302, the robotic member 302, as previously described, supports the arm 206 that supports the electromagnet 200. The arm 206 is connected to an end effector 308 which carries the arm 206.

The robotic member 300, having the drill bits 316 operatively mounted on the end effector 314, works in unison with the end effector 302 that has the electromagnet 200 operatively mounted at the outer end of the end effector 208. Three drill bits are shown for passing through the three openings 210 in the electromagnet core 202 and effect drilling of openings 164 in the fastener receiving zone 162 of the upper and lower sections 154 and 156 of the fuselage 152.

2. Picking and Inserting Multiple Fasteners (Rivets or Huck Bolts)

Figure 5A:
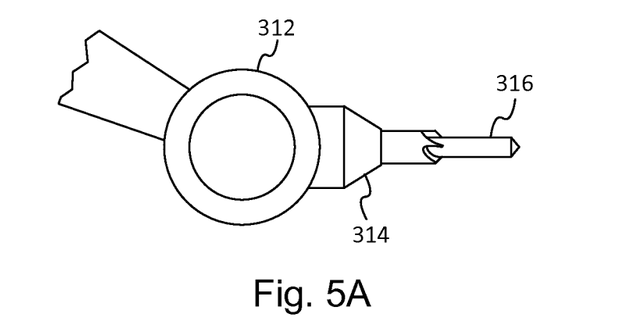
FIG. 5A is a side view of a multi-function end effector utilizing multiple countersink drill bits.
Figure 5B:
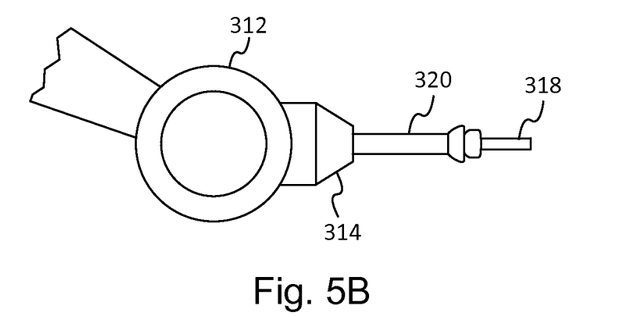
FIG. 5B is a similar side view as shown in FIG. 5A of an end effector with multiple rivets connected to the end effector.

After multiple openings 210 have been drilled simultaneously in the sections 154 and 156, the same number of fasteners (rivets 318 or huck bolts 322) are picked simultaneously by the end effector 314. Referring to FIG. 5B, although only one rivet 318 is shown, three laterally aligned rivets 318 have been picked substantially simultaneously by a holder 320 carried by the end effector 314. Three rivets 318 are then inserted into the three openings 210 that have been previously drilled in the fastener receiving zone 162 of the upper and lower sections 154 and 156 of the fuselage 152. The end effector 314 is mounted on the robotic member 300 and inserts the three rivets 318 into place after the drilling and preferably countersinking operations have taken place.

Figure 5C:
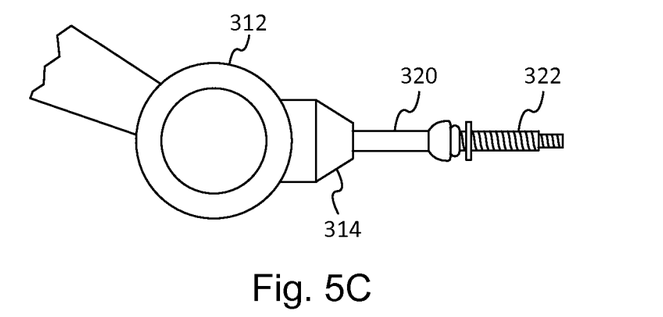
FIG. 5C is a view similar to FIGS. 5A and 5B showing the end effector with multiple huck bolts connected to the end effector.

FIG. 5C is similar to FIG. 5B except it shows the use of three laterally spaced huck bolts 322 that are received by the holder 320 rather than three rivets 318. As discussed above, the three huck bolts 322 are inserted into the openings 210. Although huck bolts 322 are used to a much lesser extent than rivets 318 in the assembly of an airplane 150. The present disclosure does provide for their use, as will be hereinafter described, since the number of huck bolts used in an airplane is a significant amount.

3. Driving or Hammering Rivets or Huck Bolts

Figure 5D:
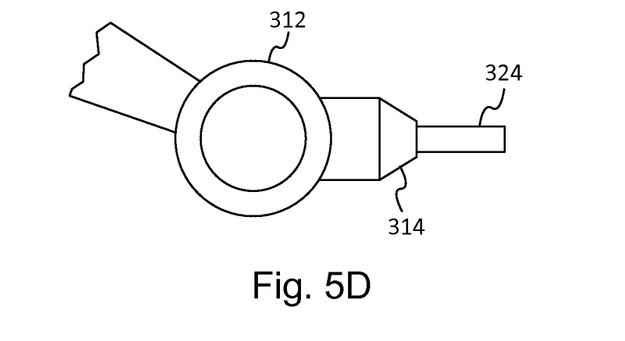
FIG. 5D is a side elevation view showing drive members connected to the end effector for driving or hammering rivets and bolts.

Following the inserting step, end effector 314 is provided for driving or hammering three rivets 318 or huck bolts 322 simultaneously in the drilled openings 164 provided in the fastener receiving zone 162. As seen in FIG. 5D, an end effector 314 has three laterally aligned hammering tools 324 in the holder 320 which simultaneously drives or hammers three rivets 318 or huck bolts 322 into the openings 164 for ultimate attachment of the rivets 318 and/or huck bolts 322 to the sections 154 and 156. Preferably, the hammering tool 324 functions similar to a jackhammer by driving the rivets 318 or huck bolts 322 further into the openings 164. When rivets are used, the hammering tool 324 drives the rivets 318 against a bucking bar which will be hereinafter described. As to the securement of huck bolts 322, their securement is accomplished manually to be described hereinafter.

To summarize, all of the above operations, that is, the simultaneous drilling, the picking and inserting of multiple rivets 318 and huck bolts into the openings 164 provided by the drilling operation, and the driving or hammering of the rivets 318 or huck bolts 322 into the drilled openings 164 are accomplished in a highly efficient and economical manner. Multiple openings 164 have been drilled, multiple fasteners have been inserted and multiple driving of the fasteners has been performed simultaneously from both the outboard side and the inboard side of the fuselage 152. Only in the case of huck bolts 322 is a manual operation required for finally securing the huck bolts to the airplane parts.

C. Backing Plates (Types 1, 2, 3, 4)

1. Type 1 Used for Securing Rivets and Assembled Directly to the Frame of the Airplane 150

Type 1 backing plate, generally 400, is shown in FIG. 6, which is a detailed isometric view of the outer side of backing plate 400. A backing plate 400 is schematically shown in FIG. 3 as representative of the general location of each of the four types of backing plates to be hereinafter described in detail. The backing plate 400, seen in FIG. 3 on the inboard side of fuselage 152, shows the general positioning of each of the four types of backing plates, to be hereinafter described, in a cooperative relationship with the outboard side of the assembly operation, that is, the drilling, inserting and driving of multiple fasteners simultaneously into the drilled openings 164.

Referring to FIG. 6, the backing plate 400 is fixedly attached directly to and between the frame sections or struts 158. The backing plate 400 is also made of a magnetizable material, such as an iron containing steel material. When the electromagnet 200 is activated, the outboard electromagnet 200 is attracted towards the fixed in place magnetizable inboard backing plate 400 for clamping the upper and lower sections 154 and 156 of the fuselage 152 together. The backing plate 400 has upper and lower portions 402 and 404 and upright side portions 406. The upper and lower portions 402 and 404 and side portions 406 create a frame around a central portion 408 of the backing plate 400.

Since the backing plate 400 is of a heavy steel material, handles 410 are provided for setting the backing plate 400 manually in place directly on the frame 160 of the airplane 150. More specifically, stringers/longerons 166, which are parts of the frame 160, are provided longitudinally along the inboard side of the fuselage sections 154 and 156 for securing the backing plate 400 directly to such parts of the frame 160. The handles 410 are secured to the backing plate 400. In addition, a locking mechanism (not shown) is provided for securing the backing plate 400 to the frame 160. Manual lock operators 414 for the locking mechanism are provided on the outer central portion 408 of the backing plate 400.

Figure 6A:
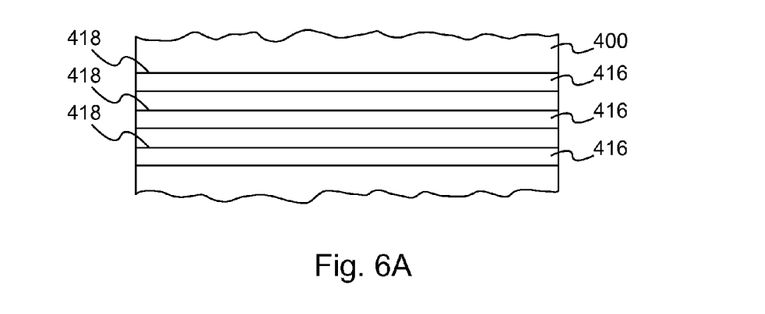
FIG. 6A is a broken view of the back side of a portion of the of the backing plate of FIG. 6 showing longitudinal horizontal bucking bars in grooves in the rear of the backing plate.

A second important function of the backing plate 400 is the provision of inwardly and outwardly moveable bucking bars 416 as seen in FIGS. 6 and 6A. The bucking bars 416 are laterally elongated and are movably mounted inwardly and outwardly within rectangular cross-section grooves 418 formed along the entire width of the inner face of the central portion 408 of the backing plate 400. Particular reference is made to FIG. 6A which shows the back side of the backing plate with the bucking bars 416 shown as three in number and are placed in a vertically spaced position in the grooves 418 of the backing plate 400. The bucking bars 416 extend for the entire width of the back side of the backing plate central section 408. Bucking bars 416 are selectively moveable between an inoperative position within the grooves 418 and are movable in an outwardly operative position in alignment with the openings 210, rivets 318 and huck bolts 322 at selected times of the assembly operation. When the bucking bars 416 are moved outwardly, they forcibly bear against the ends of the rivets 318 as the hammering of the rivets 318 occurs to thereby flatten out the ends of the rivets 318 in a conventional manner for thereby completing the securement of each of the multiple rivets 318 simultaneously during the driving\hammering operation.

Air cylinders 420 are centrally mounted on the outer side of the central portion 408 of the backing plate 400. Drive pins (not shown) are provided on the air cylinders 420 and are movable outwardly at the centers of the back sides of the bucking bars 416 in order to move the bucking bars 416 outwardly towards the ends of the rivets 318 as they are being hammered or driven against the bucking bars 416 thereby finishing the securement of the rivets 318 to the airplane sections 154 and 156. Pressurized air lines 424 extend outwardly from the ends of the air cylinders 420 and are attached to a high air pressure source for the purpose of driving the bucking bars 416 towards the ends of the rivets 318 (not shown) during the riveting operation. Three laterally spaced rivets 318 are simultaneously secured to the upper and lower sections 154 and 156 of the airplane 150.

2. Type 2 Used for Securing Rivets and Assembled to the Frame of the Airplane by Suction Cups Referring to FIG. 7, the backing plate type 2, generally 430, is shown. Backing plate 430 has its basic parts built in substantially the same manner as the backing plate 400 described above. There are instances when the backing plate 400 cannot be secured to the frame 160 of the airplane 150, such as on the stringers/longerons 166 which are parts of the frame 160. As seen FIG. 7, the backing bar assembly 430 is in its operative state. It has virtually the same component as the backing plate 400. Similar parts are shown with similar reference numbers.

Figure 7:
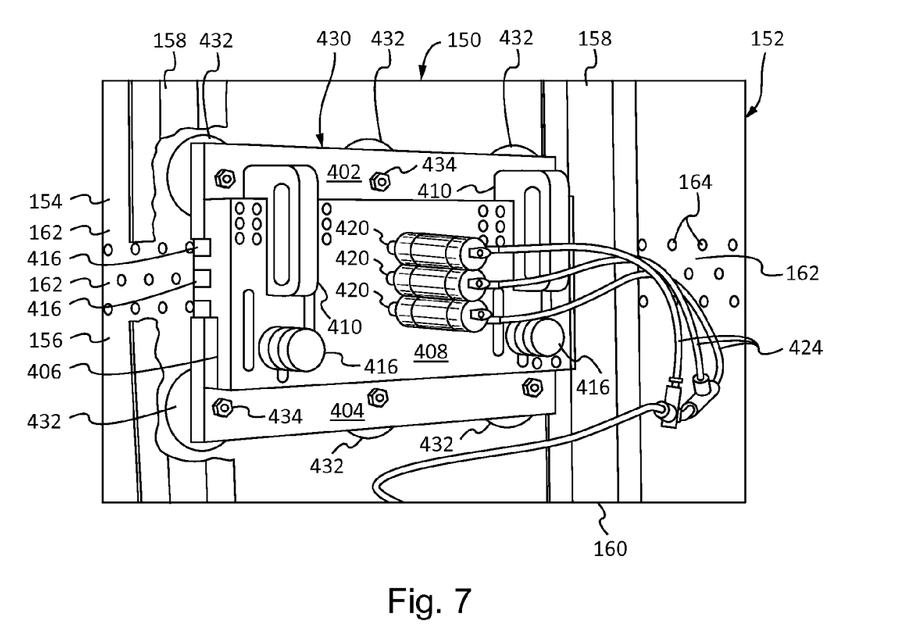
FIG. 7 is a view similar to FIG. 6 showing a backing plate in which suction cups are used to mount the plate to the inboard side of the fuselage.

Backing bar 430, however, as seen in FIG. 7, includes suction cup members 432 at each of the four corners that are secured by fastener members 434 to the upper and lower frame portions 402 and 404. In addition, suction cups 432 are provided in the centers of the upper and lower frame portions 402 and 404 between the corner suction cups 432. Other than the manner of securing the backing plate 430 to the inner sides of the sections 154 and 156 of the airplane 150, the backing bars 400 and 430 are constructed in the same manner and operate in the same manner.

3. Type 3 Used for Huck Nuts and Assembled Directly to the Frame of the Airplane 150.

Figure 8:
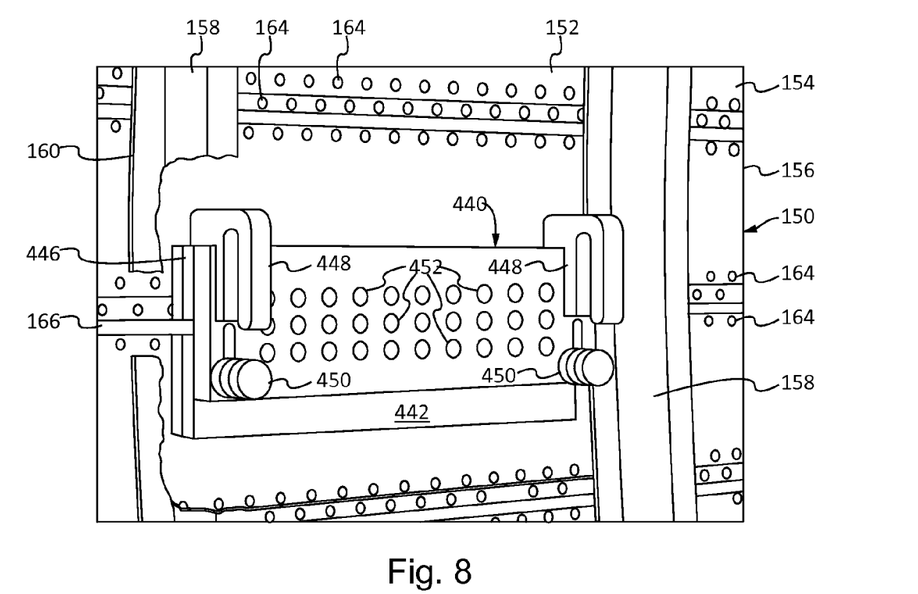
FIG. 8 is a pictorial view of a backing plate mounted on the inboard side of portions of the frame of the airplane.

Referring to FIG. 8, the backing plate Type 3, generally 440, is of a different design from backing plate 400 and backing plate 430. Backing plate 440 is fixedly secured directly to portions of the frame 160 of the airplane 150 including stringers/longerons 166 of the airplane frame 160. Backing plate 440 is also made of a magnetizable steel material and attracts the outboard electromagnet 200 when the electromagnet 200 is activated for the purpose of clamping the upper and lower sections 154 and 156 of the fuselage 152 together. The backing plate 440 includes a lower portion 442 and laterally spaced sides 446. Handles 448 are attached to the backing plate 440 for manually positioning the backing plate 440 on the frame 160 of the airplane 150. A locking mechanism (not shown) is provided for locking the backing plate 440 to the frame 160. Lock operators 450 are provided on the backing plate 440 for manually locking the backing plate 440 to the frame 160 including to stringers/longerons 166.

As shown in FIG. 8, the backing plate 440 includes multiple outwardly opening vertically and laterally spaced openings 452 which are in alignment with the ends of huck bolts 322 that have been inserted through the openings 164 in the fastener receiving zone 162 of the sections 154 and 156 of the airplane 150.

Backing plate 440 differs from the backing plates 400 and 430 since the securing of the huck bolts 322 must be accomplished manually while the riveting of the backing plates 400 and 430 is accomplished directly by machine operation as disclosed above.

Figure 10:
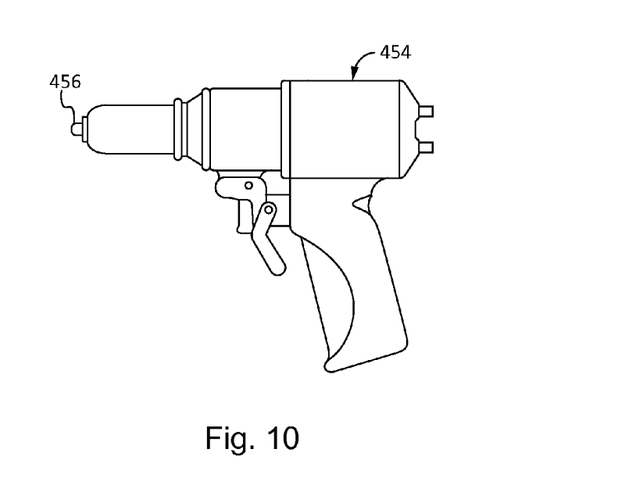
FIG. 10 is a pictorial view of one type of huck gun that can be used to finish the securing of the huck bolts through the backing plates of FIGS. 8 and 9.

Referring to FIG. 10 there is shown one type of a huck gun 454 which has its operating end 456 inserted into the openings 452 for manually securing each of the huck bolts 32 in place.

4. Type 4 Used for Huck Bolts and Attached to the Frame of the Airplane by Suction Cups Referring to FIG. 9, backing plate Type 4, generally 460, is like backing plate 440 since it is used in connection with the finishing of huck bolts 322 and is like backing plate 430 since it is attached to the sections 154 and 156 of the fuselage 152 of the airplane 150 by the use of suction cups 462. Backing plate 460 differs from backing plate 440 since it includes both upper and lower frame sections 464 and 466. The upper and lower frame sections 464 and 466 include fasteners 468, such as nuts and bolts, that secure six suction cups 462 to the backing plate 460. Like backing plate 440, multiple vertically and laterally spaced openings 470 are provided in the central portion 472 of the backing plate 460. The openings 470 are aligned with the openings 164 in which huck bolts 432 have been inserted for allowing the front end of the huck gun 454 to be inserted into the openings 470 for securing the huck bolts 432 to the sections 154 and 156 of the fuselage 152 of the airplane 150. Alternatively, a pneumatic hammer (not shown) may be used rather than a huck gun 454 to secure the huck bolts.

III. Operation

A. Assembling Components of an Airplane with Rivets

1. Backing Plate Assembled Directly to the Frame of an Airplane

Referring to FIG. 3, this pictorial view schematically shows the operation of the operating tools, as described above, wherein the robotic members 300 and 302 and the electromagnet 200 are shown on the outboard side of the fuselage 152 of the airplane 150. A backing plate 400 is schematically shown on the inboard side of the fuselage 152 of the airplane 150. The reference number 400 is assigned to the backing plate in FIG. 1 but, for purposes of simplicity is intended to represent the four different types of backing plates described above, namely, backing plates 400, 430, 440, and 460. Following the initial description of the operation, the backing plate numbers 430, 440, and 460, for the most part, will be referred to by their actual reference numbers.

As described above, the airplane 150 has a fuselage 152 as seen in FIG. 3. Upper and lower sections 154 and 156 of the fuselage 152 are mounted on the frame 160 and the overlapping portions of the sections 154 and 156 provide a fastener receiving zone 162 where the sections are to be secured together.

It is to be understood that in addition to the overlapping sections of the fuselage sections 154 and 156, the fastener receiving zone 162 also include portions of the frame 160, such as stringers/longerons 166, through which fasteners (rivets 318 or huck bolts 322) are attached. Therefore, the description of the operation will generally refer to overlapping upper and lower sections 154 and 156 of the fuselage 152. It is to be understood, however, that the term "fastener receiving zone" may include more than only two components of the airplane 150 and could involve components other than portions of the fuselage 152 and portions of the frame 160.

(a) Drilling

The first step in the assembly process after positioning of the fuselage sections 154 and 156, openings must be provided for receiving fasteners. Since the backing plate 400 is of a magnetizable, iron-containing steel material, the electromagnet 200 is positioned by the robotic member 302 on the on the outboard side of the fuselage 152. Communication by an electronic communication system (not shown) is provided between the backing plate 400 and the electromagnet 200 in order to position the electromagnet 200 opposite the backing plate 400 which is positioned on the inboard side of the fuselage 152. The electromagnet 200 is movable in position by the robotic member 302 and the coil 204 on the electromagnet 200 is activated. The electromagnet 200 is drawn the with a high electromagnetic force against the exterior sections 154 and 156 of the fuselage 152 since the electromagnet 200 is positioned opposite the magnetically attractive backing plate 400 on the inboard side of the fuselage 152. The upper and lower sections 154 and 156 of the fuselage 152 are then clamped tightly together and the three openings 210 in the electromagnet 200 are in an aligned position opposite the backing plate 400.

Since the area behind the electromagnet 200 is spaced laterally away from the end effector 208 on the robotic member 302, there is an open space behind the electromagnet 200. At this point, the robotic member 300 moves the end effector 314 to an aligned position with the electromagnet 200 and specifically, the drill bits 316 are in an aligned position with the openings in the electromagnet 200 by operation of an electronic control member (not shown) and the drill bits 316 are simultaneously passed through the three openings in the electromagnet 200. The three openings 210 in the electromagnet 200 and the drill bits 316 are positioned in a normal position against the fastener receiving zone 162 of the overlapping upper and lower sections 154 and 156 of the fuselage 152. Multiple openings, preferably countersunk, are then drilled simultaneously in a generally horizontally or laterally aligned position and provide the openings 164 in both the upper and lower sections 154 and 156 in the fastener receiving zone 162. The robotic member 300 then withdraws the three drill bits 316 from the openings 210 in the electromagnet 200 and the electromagnet 200 and drill bits 316 may be advanced to the next position by the respective robotic members 300 and 302. Alternatively, a multiple head robotic member (not shown) may be provided for further repeated steps in the assembly system being described. With respect to the openings 164 that have been drilled in the fastener receiving zone 162, the next step is to provide a picking and inserting operation for the rivets 318 or huck bolts 322.

It is to be understood that the drilling operation preferably also provides countersinking for the openings 164. Preferably bushings (not shown) are provided on the opposite sides of the openings 164 to be formed on the inboard side and outboard side of the openings 164. The openings 164 when drilled in accordance with the described operation substantially avoid a need for subsequent deburring.

It is seen that the simultaneous drilling of multiple openings 164 by multiple drill bits 316 is simultaneously performed by the two robotic members 300 and 302. The electromagnet 200 is provided on the outboard side of the fuselage 152, while on the inboard side of the fuselage 152, the backing plate 400 magnetically attracts the electromagnet 200 to tightly clamp the fuselage sections 154 and 156 together during the drilling operation. Less debris is provided and generally, deburring is unnecessary.

(b) Picking and Inserting Operation

The next step is to provide an end effector 314 on the robotic member 300. Three rivets 318, which are aligned with the three openings 210 in the electromagnet, pick three rivets 318 from a supply of rivets 318. The three rivets 318 are aligned with the three openings 210 and the electromagnet 200 and three rivets are simultaneously inserted into the openings 164 that have been drilled in the two sections 154 and 156 of the fuselage 152. The rivet holders 320 are withdrawn.

Alternatively, for picking and inserting huck bolts 322 into the openings 164, a huck bolt holder 320 is provided for simultaneously picking three huck bolts 322 simultaneously and inserting them simultaneously into three openings 164 that have been provided by the drilling operation.

(c) Driving/Hammering

Referring to FIG. 5D, another holder 314 is provided on the end effector 312. The holder 314 is for receiving three hammering tools 324 which again are aligned with the three openings 210 in the electromagnet 200 and with the heads of the rivets 318 or huck bolts 322. The hammering tool 324 drives the rivets 318 or the huck bolts 322 fully into the openings 164. The hammering operation is different for rivets 318 and huck bolts 322. Up to the point of the hammering operation by the hammering tool 324, the backing plate 400 is involved in the operation to effect a clamping operation of the sections 154 and 156 between the electromagnet 200 and the backing plate 400.

In the case of rivets 318, one of two backing plates 400 or 430 is used. The operator on the inboard side of the fuselage 152 uses the backing plate 400 or 430. If the backing plate is to be used at an area on the inboard side of the fuselage 152 where the backing plate can be secured directly to the frame, the backing plate 400 is selected. Alternatively, if the backing plate to be used for the riveting operation cannot be secured directly to the frame, the backing plate 430 must be used. The backing plate 430 uses suction cups to be secured directly to the interior of the fuselage sections 154 and 156.

Whether the backing plate 400 is used or the backing plate 430 is used, the rivets 318 are secured in a generally conventional manner by hammering the heads of the heads of the rivets 318 with the hammering tool 324, as shown in FIG. 5D, from the outboard side of the fuselage 152. On the inboard side of the fuselage, whether a backing plate 400 or a backing plate 430 is used, bucking bars 416 on the inner face of the backing plate 400 or 430 are driven outwardly by activating the air cylinders 420 that have drive pins (not shown) that force the backing bars 416 outwardly to flatten the three ends of the rivets 318 to thereby secure the multiple rivets 318 simultaneously by the hammering and by an aligned bucking bar 416. During the operation for securing the rivets 318, the backing plate 400 or 430 remains in a fixed position on the frame 152 while the bucking bar or bars 416 are moved outwardly to effect the securement of the rivets by the flattening of the ends thereof.

Figure 9:
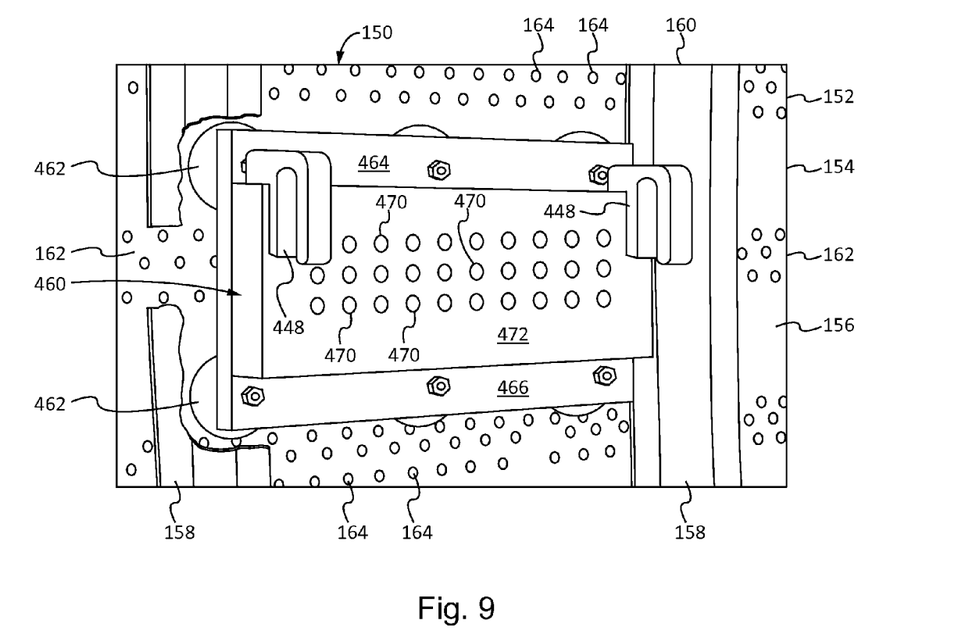
FIG. 9 is a view similar to FIG. 8 wherein the backing plate is mounted on the inboard side of the airplane by the use of suction cups.

In the case of securing huck bolts to the sections 154 and 156 of the fuselage 152, backing plates 440 or 460 must be utilized. Backing plate 440 is used if the operator on the inboard side of the airplane fuselage 152 learns that the backing plate can be mounted directly to the frame 160 of the airplane, then the backing plate 440 is used for the huck bolts 322. In case the backing plate cannot be mounted to the frame 152, then the backing plate 460 is used by having the suction cups 462 securing the backing plate 460 against the fuselage sections 154 and 156.

Neither of the backing plates 440 or 460 use bucking bars 416 since the finishing of the huck bolts must be performed by inserting the end 456 of the huck gun 454 inserted into the openings 452 or 470 provided in the backing plates 440 or 460. Alternatively, a pneumatic hammer (not shown) may be provided for securing the bolts 322.

Even though a manual operation is required for securing huck bolts 322 in the assembly of the fuselage sections 154 or 156 or other components, the amount of manual operation required for the complete assembly of the airplane 150 with rivets and huck bolts is minimal. Relative to the use of rivets 318, huck bolts are not used as extensively. Therefore, the overall assembly process described results in significantly reduced time relative to prior art methods and apparatus.

IV. Alternate Backing Plate

Referring to FIG. 11, there is shown a view of an alternate backing plate, generally 500 that can be used if one of the backing plates 400, 430, 440, or 460 is not used if the frame 160 of the airplane cannot accommodate any of them. The alternate backing plate 500 provides a smaller and lighter weight backing plate and does provide the assembler with another working tool.

Referring to FIG. 11, the alternate backing plate 500 becomes magnetic when energized by the outboard electromagnet 200 and is mounted on a support arm 502 of an inboard robotic member (not shown). Alternatively, the alternate backing plate may be mounted to a stringer (not shown) in a manner similar to the backing plates 400 and 440. The movement of the inboard robotic member is carried out by an electronic control system (not shown).

The fuselage 152 includes upper and lower sections 154 and 156 which overlap at the fastener receiving zone 162, between struts 158 of the frame 160. The outboard side of the fuselage 152 has the same robotic member 302 controlling the positioning of the electromagnet 200 and the same robotic member 300 controlling the positioning of the end effector 314 for all the drilling, picking/inserting, and hammering operations as previously described.

The alternate backing plate 500 operates the same as the backing plates 400, 430, 440, and 460 as previously described. Specifically, the alternate backing plate 500 functions the same as the magnetically attractive backing plates 400, 430, 440, and 460 in that the electromagnet 200 on the outboard side of the fuselage 152 is attracted to the alternate backing plate 500 to clamp the fuselage sections 154 and 156 together.

Backing plate 500 is relatively smaller in size than the backing plates 400, 430, 440 and 460. The backing plate 500 differs further in that it is movable by a control system (not shown) to move between the struts 158 of the frame 160. Also, the alternate backing plate 500 is relatively narrowly sized.

The backing plate 500 has multiple pressurized air cylinders 504 which are vertically aligned and spaced from each other on the central outer side thereof. Further, three bucking bars 506 are mounted in a vertically spaced position on the inner or back side of the backing plate 500 in a manner similar to the generally horizontal bucking bars 416 shown in FIG. 6A of the backing plate 400. The pressure cylinders 504 are each aligned with a bucking bar 506 for driving the bucking bars 506 outwardly during the riveting operation.

The operation of the alternate backing bar 500 is substantially the same as previously described relative to the backing plates 400, 430, 440, and 460. Briefly, the operations are:

1) Drilling—The electromagnet 200 is placed against the outboard side of the fuselage 152 generally at the fastener receiving zone 162. The alternate backing plate 500 is placed against the inboard side of the fuselage 152 at the fastener receiving zone 162 and is aligned with the electromagnet 200. When the electromagnet 200 is activated, the upper and lower sections 154 and 156 of the fuselage 152 are clamped together and openings 164 are drilled since the robotic member 300 has positioned the drill bits 318 within the openings 210 in the electromagnet 200.

2) Picking/Inserting Rivets—Multiple rivets are picked and inserted into the openings 164 while the electromagnet 200 remains activated.

3) Riveting—After withdrawal of the insertion members, the multiple hammering members 324, drive the rivets 318 from the outboard side while the air cylinders 504 on the aligned bucking bars 506 on the backside of the backing plate 500 drive the bucking bars 506 towards the ends of the rivets 318 to secure them by flattening the rivet ends to secure the sections 154 and 156 at the fastener receiving zone 162. The operation as described provides drilling, inserting and securing of multiple rivets 318 to provide a significant reduction in assembly time of the fuselage components.

While the disclosure has been described with reference to certain embodiments, it will be understood by those skilled in the art that various changes may be made and equivalents may be substituted without departing from the spirit and scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. An apparatus for performing at least one step for assembling first and second unassembled components of a structure with fasteners, said structure having a preexisting frame supporting said first and second unassembled components, said frame having an outboard side and an inboard side, said first and second unassembled components having a combined fastener-receiving zone, said apparatus comprising:

a first robotic member positioned adjacent said outboard side, wherein the first robotic member comprises a first arm member and a first end effector coupled to the first arm member;

an electromagnet mounted on the first end effector of said first robotic member for moving said electromagnet between an operative position and an inoperative position;

said operative position being against said combined fastener-receiving zone on said outboard side;

said electromagnet having a central magnetizable core with multiple openings in said central magnetizable core and an electrical coil surrounding said central magnetizable core;

a second robotic member positioned adjacent said outboard side wherein the second robotic member comprises a second arm member and a second end effector coupled to the second arm member;

a tool carrier operatively mounted on the second end effector of said second robotic member for operative passage of tools through said multiple openings in said central magnetizable core of said electromagnet;

a magnetically attractive member mounted on said inboard side aligned with said operative position of said electromagnet at said combined fastener-receiving zone on said inboard side, said magnetically attractive member attracting said electromagnet when said electromagnet is activated; and the tools being mounted on said tool carrier and conducting said at least one step of assembling said first and second unassembled components together.

2. The apparatus of claim 1 wherein said fasteners comprise rivets, and said at least one step comprises said tool carrier drilling multiple openings in said first and second unassembled components for later passage of said rivets through said openings in said central magnetizable core.

3. The apparatus of claim 2 wherein said tool carrier includes means for inserting multiple rivets through said openings in said central magnetizable core.

4. The apparatus of claim 3 wherein said magnetically attractive member has an inner side, wherein at least one bucking bar is mounted on said inner side and is aligned with one of said multiple rivets for securing said one of said multiple rivets to said first and second unassembled components.

5. The apparatus of claim 4 wherein at least one actuator is provided on said magnetically attractive member to operate said at least one bucking bar and secure said multiple rivets to said first and second unassembled components.

6. The apparatus of claim 4 wherein said at least one bucking bar is elongate and extends along a majority of a width of said magnetically attractive member.

7. The apparatus of claim 6 wherein said at least one bucking bar extends along an entire width of said magnetically attractive member.

8. The apparatus of claim 4 wherein a plurality of bucking bars are mounted on said inner side of said magnetically attractive member, each of the plurality of bucking bars being aligned with a respective one of said multiple rivets.

9. The apparatus of claim 8 further comprising a plurality of actuators mounted on an outer side of said magnetically attractive member, wherein each of the plurality of actuators operates a respective one of said plurality of bucking bars.

10. The apparatus of claim 1 wherein said fasteners comprise huck bolts, and wherein said magnetically attractive member includes multiple openings aligned with said huck bolts for providing access for manually securing said bolts to said first and second unassembled components.

11. The apparatus of claim 10 wherein said multiple openings comprise a plurality of sets of openings laterally offset from each other across a width of said magnetically attractive member, each set of openings comprising multiple openings aligned in a direction perpendicular to said width of said magnetically attractive member.

12. The apparatus of claim 1 wherein said magnetically attractive member is mounted directly on said frame.

13. The apparatus of claim 12 further comprising manual lock operators coupled to said magnetically attractive member for manually mounting said magnetically attractive member to said frame.

14. The apparatus of claim 1 wherein said magnetically attractive member is mounted on at least one component of said structure with suction cups.

15. The apparatus of claim 1 further comprising handles secured to said magnetically attractive member for manually setting said magnetically attractive member in place relative to said frame.

16. The apparatus of claim 1 further comprising a third robotic member positioned adjacent said inboard side, wherein said third robotic member is operable to mount said magnetically attractive member on said inboard side.

17. The apparatus of claim 1 wherein said second robotic member moves said tool carrier behind said electromagnet to pass each of the tools through a respective one of said multiple openings in said central magnetizable core of said electromagnet from behind said electromagnet to in front of said electromagnet.

18. The apparatus of claim 1 wherein said central magnetizable core has an oval shape.

19. The apparatus of claim 18 wherein said multiple openings are aligned with a length of said oval shape of said central magnetizable core.

20. The apparatus of claim 1 wherein said structure is an airplane.

* * * * *